March 31, 1964 C. W. MORRIS 3,126,847
PLANTER
Filed Jan. 29, 1962

INVENTOR
CHARLES W. MORRIS

BY Fred. E. Shoemaker
Fred L. Witherspoon, Jr.
ATTORNEYS

United States Patent Office 3,126,847
Patented Mar. 31, 1964

3,126,847
PLANTER
Charles W. Morris, Rte. 1, Paris, Tenn.
Filed Jan. 29, 1962, Ser. No. 169,445
6 Claims. (Cl. 111—4)

This invention relates to planters and more particularly to manually manipulated planters especially adapted for planting tree and vegetable seedlings and the like in cultivated or uncultivated soil irrespective of the presence or absence thereon of turf or other vegetative growth.

It is a general object of the present invention to provide a novel and improved planter of the type described whereby to facilitate the planting of seedlings, improve their chances of growth and reduce the amount of time and effort required by the operation.

More particularly it is an object of the invention to provide a manual planter usable in any type of soil and including a slotted tube which remains in the ground to the full depth to which the plant is set to facilitate the insertion of the roots and to prevent any interference by earth or vegetation with such insertion, and which is then removed after inserting the plant.

An important object of the invention resides in the provision of means for the combined use of a slotted tube and inserted dibble to prepare the initial planting hole after which the dibble only is at least partially withdrawn leaving a sheathed hole to permit ready insertion of a plant.

Another important object of the invention consists in the provision of planting means constructed to insure full visibility and manual manipulation of the plant until it is inserted to its full desired depth in a sheathed hole.

Still another important object of the invention resides in the provision of adjustable stop means to determine the depth of hole prepared for planting.

An important feature of the invention consists in providing separate tilted handles for use in inserting and removing the planter and separately actuating the dibble, the handles being so arranged as to cooperate and partially nest one within the other for use when making the initial insertion of the planter into the ground.

Other and further objects and features of the invention will be more apparent to those skilled in the art upon a consideration of the accompanying specification and attached drawing wherein is disclosed a single exemplary embodiment of the invention, it being understood that such changes and modifications may be made therein as fall within the scope of the appended claims without departing from the spirit of the invention.

Figure 1:
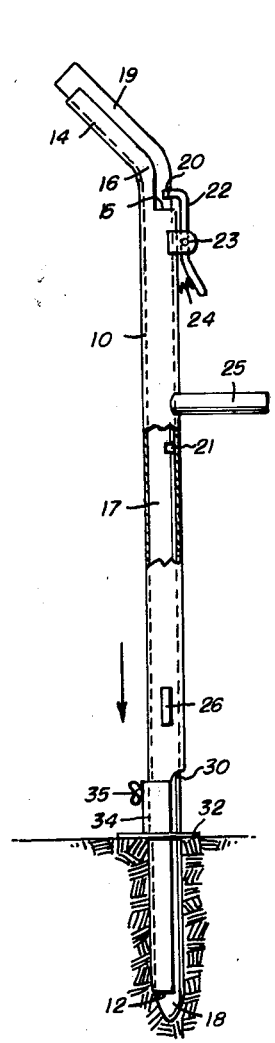
FIGURE 1 is a side elevation of a planter constructed according to the present invention shown inserted in the soil with the dibble extended.

The transplanting of small plants or seedlings of many types often calls for manual operations, either because the number required to be planted is insufficient for efficient use of automatic machinery or because the terrain and the presence of obstructions and the like is such that it cannot be used adequately.

Heretofore various types of planters or so-called "transplanters" have been proposed for planting tree seedlings, ornamental hedges and shrubbery, vegetable and ornamental plants and the like, but in most cases these have been of a complex and cumbersome character, heavy to carry and handle and inadequate in operation. Most of them require that the plant be dropped down a tube wholly out of control of the operator, after a dibble or spear has been inserted through the tube or through a branch thereof to provide an opening in the ground. Such openings, after dibble withdrawal, do not always remain clear so that the plant root can be readily inserted, for in light or sandy soils the walls may crumble and fall in, and in soils covered with vegetation of one type or another this may spring back in place after the dibble is withdrawn and interfere with the insertion of the delicate roots of some seedlings. The present invention eliminates these difficulties by providing a sheath, such as a tube or pipe, which surrounds the dibble at the time that it is inserted in the soil and remains in place after the dibble is withdrawn. This tube, in the whole area inserted in the ground and for several inches above is provided with a wide longitudinal slot through which the plant roots are inserted laterally just above ground level with the dibble withdrawn and thus the plant remains under control of the operator, and is not dropped so that the roots are compacted at the bottom of the hole due to the weight and momentum of the falling plant.

The earlier forms of planting devices being large in diameter and having lateral protuberances cannot be used to compact the soil around the plant roots except by having a plate overlying the soil which may be pressed down to some extent, but this only closes the soil around the top of the plant leaving the roots more or less suspended in air space where, in any but very damp weather, they are apt to die. Moreover, this may leave the delicate tap root bent and compacted at the bottom of the hole whereas with the present arrangement the tube, which forms the sheath in the hole to readily admit the plant root, serves to keep out any soil which may tend to fall in until the tube has been withdrawn and keeps all vegetation out of the way. After the tube has been withdrawn the dibble may be re-inserted and the planter pushed into the soil just adjacent the hole containing thet plant to thereby force earth laterally for the full depth of the plant into the hole containing the latter to insure full contact of soil with the roots while the plant is held suspended above the bottom of the hole by the operator's hand, thus keeping the tap root straight and undamaged.

Referring now to the drawings for an understanding of the invention, the figures show at 10 a steel tube of appropriate diameter and bore providing a rigid wall of considerable thickness to stand the strain of hard usage. It is of suitable height for convenient operation and has its lower end preferably cut off at right angles and tapered as shown at 12 to aid in the insertion into the soil.

At the upper end of the tube one-half of the circumference of the same is cut away leaving the semi-cylindrical portion 14 which is bent as at 16, after having been severed at 15, to an angle of about 45 degrees to the tube axis to clear an entrance for the insertion of the dibble rod 17 which has a close but working fit inside of the tube and while illustrated as solid may be formed of a thick walled tube having a drawn in tapered end 18 which extends beyond the end of the tube so that its taper and that on the tube end are substantial continuations. The distance that the dibble may be inserted into the tube is limited by the engagement of its bent over handle portion 19, having the same angularity as the handle section 14 of the tube but being somewhat longer so that it may be separately grasped to withdraw it. It nests in the half-cylindrical handle of the tube.

Figure 3:
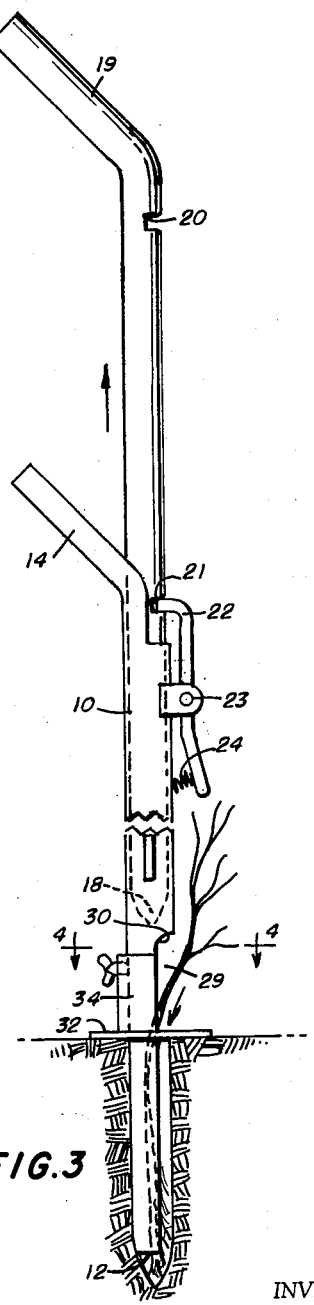
FIGURE 3 is a view similar to FIGURE 1 on an enlarged scale, but illustrating a plant positioned in the hole formed by the planter and vacated by the withdrawn dibble.

In order that the dibble may be held fixed to the tube so that both may be inserted into the soil simultaneously to form a planting hole, the dibble has two notches, 20 and 21 therein, as seen in FIGURE 3, the former being just below the bend therein for engagement by the latch portion 22 bent as shown and being fulcrumed at 23 from a support attached to the tube and held in the notch by helical spring 24 so that it may be withdrawn by pressure on the lever above the spring. The second notch 21 is so positioned on the dibble that the latter may be held elevated about one-third of its height and held there with its lower end above the tube slot.

Figure 2:
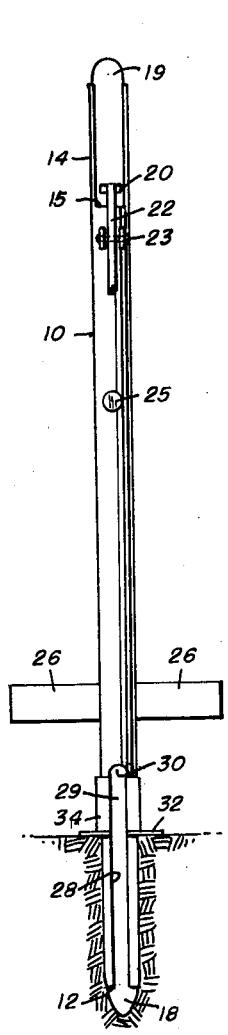
FIGURE 2 is a front elevation thereof showing the planting slot.

The nesting of the handles 14 and 19 as shown in FIGURES 1 and 2 permits the operator to grasp both portions at once and push them into the ground making use also of his other hand, if desired, operating on a laterally projecting handle 25 extending from the tube below the top, and, where the soil is particularly hard, he may step on one of the low mounted bars or steps 26 welded to and extending radially from the tube.

As pointed out above, in using the older types of planters the seedling must be dropped down a tube and is out of the control of the operator. Applicant provides against this undesirable situation by slotting tube 10 longitudinally as seen at 28 in FIGURE 2. The slot is sufficiently wide to pass the thickest clump or roots which would ordinarily be required to be inserted therein and is sufficiently long so that when the combined tool unit is inserted to its approximate maximum depth, for the types of plants for which the device is designed, a considerable portion of the slot extends above the surface of the soil as seen at 29 in FIGURE 3 so that the plant roots may be inserted while the stem of the plant is still held in the hand of the operator. Of course, the dibble must first be withdrawn for this purpose so that the second notch 21 is engaged by the latch to hold it in that position above the upper end 30 of the slot 28. In this manner the hole in the soil is sheathed, except for the small area of the slot, after the dibble is withdrawn and all vegetation and loose soil is kept out of the hole so that it remains fully open for the insertion of the delicate plant roots. The plant being under the control of the operator is not dropped but is rather inserted in the opening so that the tap root is not damaged, bent or tangled with the other roots. The combined tube and dibble units can now be withdrawn by grasping the tube handle 14 or the dibble handle 19 while still holding the plant. The latch is now released so that the dibble drops to the bottom again and now the unit planter is inserted to form a hole parallel to and close to the one holding the plant thereby forcing soil laterally for the full depth of the planting hole to insure encasing the roots and preventing them from drying out. This provides a much superior planting procedure than the practice of trying to push the soil around the roots by tamping it above the top of the hole for this merely compresses a small part around the upper end of the hole, clamps the stem of the plant and allows the roots to dangle or pile up against the bottom of the hole as the result of having been dropped in at considerable velocity. With the present planter the incidence of plant death as the result of drying out is very substantially lower than with the other types of planters.

The extended longitudinal slot 28 in the tube or sleeve does not materially weaken it principally because of the presence of the dibble within to support the tube at the time that it is inserted into the soil.

The full length of the slot with which the sleeve or tube is provided facilitates withdrawal of the planter without damaging the plant since the plant stem is not drawn up or the leaves damaged by any tube passing over it as with the usual types of planters. Moreover, it is inserted nearly straight in and therefore stands substantially straight when the planter is withdrawn. Because of the presence of the tube in the hole at the time the plant is inserted the required size of hole to be formed is substantially less, requiring less tamping and decreasing the possibility of death to the plant by reason of lack of contact between the roots and the earth. Moreover, it reduces the size of the planter very materially and, hence, its weight which is quite a factor when it may have to be used for a long period of time.

During use the continued withdrawal of the dibble and its re-insertion makes the device self cleaning. The full length slot permits the operator to hold the plant through all stages of operation as recommended by the forestry regulations and particularly allows a slight lifting of the plant after it has reached the bottom of the hole in order that the roots may turn downwardly, their natural position, rather than upward.

The planter described above is extremely simple in operation as well as in construction, is trouble free, light in weight and permits a higher rate of speed of planting while being more maneuverable in tall weeds, briars, brush and the like in forestry planting operations.

Figure 4:
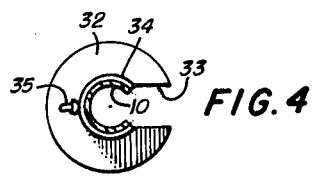
FIGURE 4 is a transverse section through the planter taken on line 4—4 of FIGURE 3.

Sometimes it is highly desirable to control the depth of the hole in which plants are to be inserted and this depth should be dependent upon the size and extent of the root system and the distance which it should be planted beneath the soil surface. To facilitate a control of this sort a soil plate 32 is provided, seen best in FIGURE 4, comprising a circular disc having a cut-out 33 to correspond in width to the slot 28 and fitted with an integral collar 34 having a close fit about the tube 10. This sleeve is also provided with a cut-out coinciding with the slot in the tube. The plate may be adjusted lengthwise of the planting tube for instance by loosing the lock screw 35, sliding the plate to the desired position and tightening the screw. The principal purpose of this plate is to control the depth of insertion of the planter, and not as in some others to attempt to hold down the vegetation to prevent it from interfering with the insertion of the roots, for this latter is done primarily by the presence of the tube, adjacent the slot 28, forming a liner for the hole.

What is claimed as new and desired to be secured by Letters Patent is:

1. In a planter of the type described in combination, a straight tube having its lower end cut off substantially at right angles and sharpened, a dibble rod filling and slidable in said tube and having a pointed lower end, latch means on said tube, first means on said rod to be engaged by said latch to hold said dibble in said tube with its pointed end extending beyond the tubes lower end, said tube being longitudinally slotted from its lower end for a distance greater than the normal depth of insertion of the tube into the ground, and second means on said rod to be engaged by said latch to hold said dibble elevated with its point above the upper end of said slot whereby a portion of the slot is open above ground for plant insertion therethrough.

2. The planter of claim 1 in which said tube has one half of the circumference of its upper end removed and the remainder bent away from the tube axis to an angle of the order of 45° to provide a handle, and the dibble being similarly bent to provide a handle thereon adapted to nest within the first handle and limit the extension of the dibble point beyond the tube lower end.

3. The planter of claim 2 having a ground engaging disc, a sleeve extending upwardly from said disc, means in said sleeve to adjustably secure the disc to said tube to limit its insertion into the ground, said disc and sleeve each having a radial slot positioned correspondingly to that in the tube.

4. A planter for seedlings and the like comprising a straight cylindrical tube, a dibble rod closely fitting but slidable in said tube, a conical pointed end on said dibble rod, means for limiting insertion of the rod into the tube so that only said end extends beyond the tube lower end, said tube lower end having an extension of said conical end formed thereon, a longitudinal slot of a width to pass plant roots extending from said tube end upwardly a distance greater than the depth to which plants must be planted and cooperating means on said tube and rod to hold the dibble in either its end extending position or in a second position with its point above the upper end of said slot, whereby a plant may be dropped into the tube and its upper end held while the tube is withdrawn.

5. The planter as defined in claim 4 in which the means for limiting insertion of the rod into the tube includes the arrangement in which the upper end of said tube is halved longitudinally and bent to an angle of the order of 45° away from the tube axis to form a handle section and the dibble rod is correspondingly bent to form a handle section nestable in that of the tube for joint use in inserting the planter into the ground.

6. The planter as defined in claim 5 in which the nested handles are bent away from the slotted side of the tube and are constructed to limit the dibble protrusion below the lower end of the tube to only the conical end portion of the dibble.

References Cited in the file of this patent

UNITED STATES PATENTS

| | | |
|---|---|---|
| 323,419 | Hiller | Aug. 4, 1885 |
| 353,070 | Kempe | Nov. 23, 1886 |
| 2,857,864 | Cromer | Oct. 28, 1958 |
| 2,900,153 | Lazur | Aug. 18, 1959 |
| 3,014,443 | Keyser | Dec. 26, 1961 |

FOREIGN PATENTS

| | | |
|---|---|---|
| 345,169 | Germany | Dec. 6, 1921 |
| 1,036 | Great Britain | Apr. 28, 1853 |
| 65,436 | Norway | Apr. 9, 1941 |